(12) United States Patent
Asai et al.

(10) Patent No.: US 7,340,161 B2
(45) Date of Patent: Mar. 4, 2008

(54) STRUCTURE OF A CAMERA MODULE WITH AUTO-FOCUS FEATURE AND A MOBILE CONNECTOR THEREFORE

(75) Inventors: Kiyoshi Asai, Tokyo (JP); Shigeru Yagi, Tokyo (JP)

(73) Assignee: SMK Corporation, Tokyo (JP)

( * ) Notice: Subject to any disclaimer, the term of this patent is extended or adjusted under 35 U.S.C. 154(b) by 313 days.

(21) Appl. No.: 11/228,443

(22) Filed: Sep. 15, 2005

(65) Prior Publication Data

US 2006/0098969 A1    May 11, 2006

(30) Foreign Application Priority Data

Nov. 5, 2004    (JP) .............................. 2004-321899

(51) Int. Cl.
*G03B 3/00* (2006.01)
*G03B 17/00* (2006.01)

(52) U.S. Cl. ......................................... 396/89; 396/542

(58) Field of Classification Search .................. 396/89, 396/125, 133, 542, 543; 439/67, 70, 71, 439/495, 607

See application file for complete search history.

(56) References Cited

OTHER PUBLICATIONS

Patent Abstracts of Japan for JP2004-063425 published Feb. 26, 2004.

*Primary Examiner*—Rodeny Fuller
(74) *Attorney, Agent, or Firm*—Darby & Darby P.C.

(57) ABSTRACT

A connection structure for a camera module with an auto-focus feature and a module connector that eliminates the need for wires and FPCs for connection between motor signal terminals and a printed circuit substrate, as will as the need for solder connection operations is also eliminated. A cameras module with an auto-focus feature is equipped with a module base on which is disposed a camera signal contact terminal, and a main module unit on which is disposed a motor signal terminal extending from a side surface. A module connector includes an installation cavity for installing the camera module. A motor signal contact is disposed on the module connector, and the motor signal terminals are formed with a contact, which comes into contact with contacts of the motor signal contact when the camera module is installed in the installation cavity.

5 Claims, 9 Drawing Sheets

Prior Art

Fig. 7(b)

Prior Art

Fig. 7(c)

Prior Art

Fig. 8(a)

Prior Art

Prior Art

STRUCTURE OF A CAMERA MODULE WITH AUTO-FOCUS FEATURE AND A MOBILE CONNECTOR THEREFORE

INCORPORATION BY REFERENCE

The present application claims priority under 35 U.S.C. § 119 to Japanese Patent Application No. 2004-321899 filed on Nov. 5, 2004, which is hereby incorporated by reference in its entirety.

FIELD OF THE INVENTION

The present invention relates to a structure for connecting a camera module with an auto-focus feature to a module connector that includes a mounting cavity for installing the module, and more particularly to the structure which connects to camera signal terminals.

BACKGROUND OF THE INVENTION

Figure 7A:
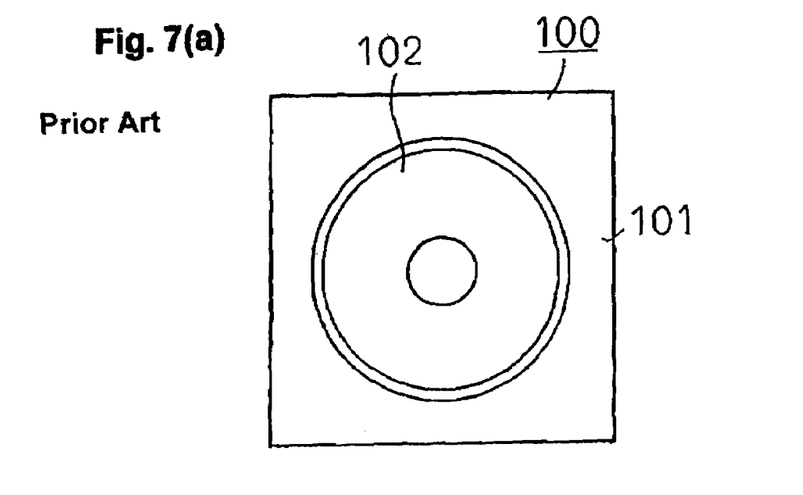
FIG. 7(a) is a plan drawing of a conventional camera module.
Figure 7B:
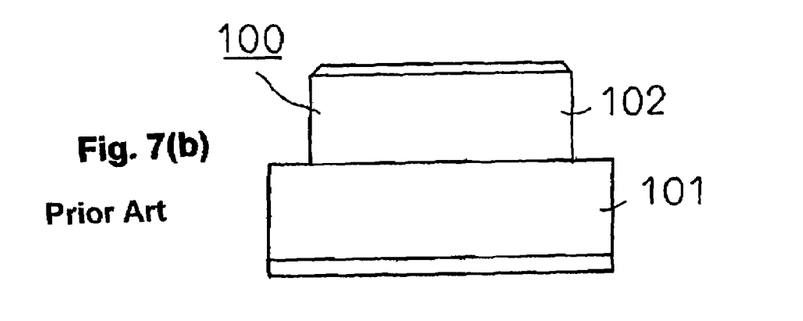
FIG. 7(b) is a front-view drawing of the camera module of FIG. 7(a)
Figure 7C:
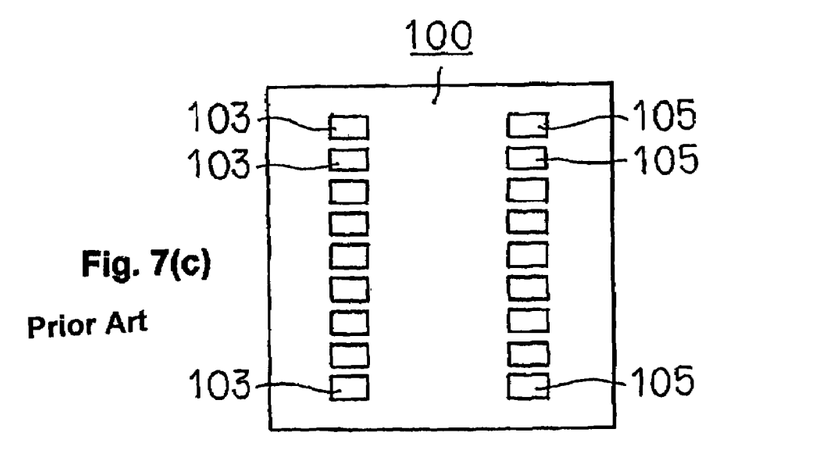
FIG. 7(c) is a bottom-view drawing of the camera module of FIG. 7(a)
Figure 8A:
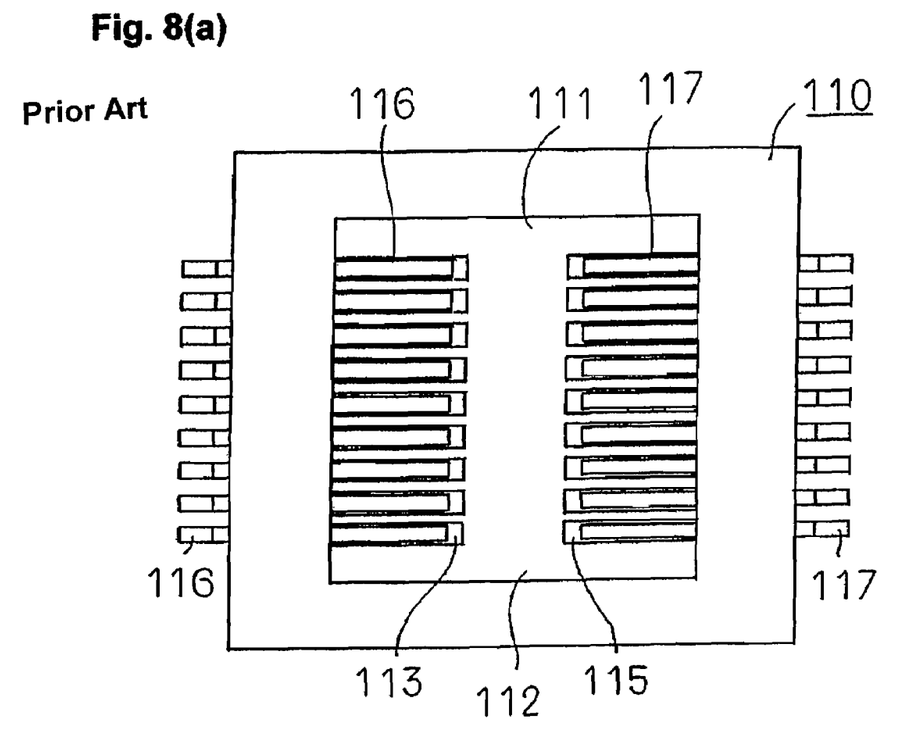
FIG. 8(a) is a plan drawing of a camera module connector.
Figure 8B:
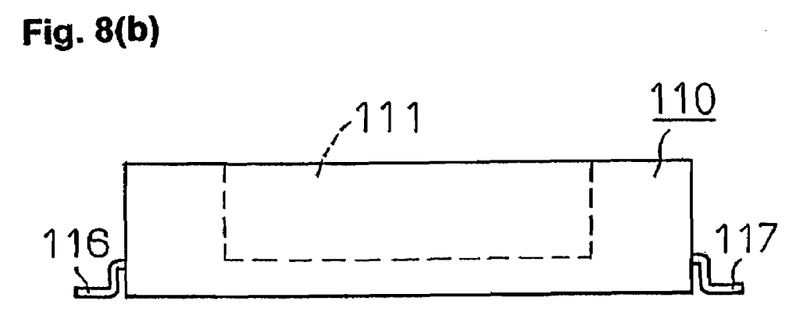
FIG. 8(b) is a front-view drawing of the camera module connector of FIG. 8(a)

In recent years, the use of portable telephones with cameras has increased greatly, and there has been a demand for more features such as auto-focus and exposure adjustment capabilities. An example of a camera module 100 mounted in a portable telephone with a camera is shown in FIG. 7(*a*), (*b*), (*c*). An example of a module connector 110 that electrically connects the module 100 to a printed circuit substrate is shown in FIG. 8(*a*), (*b*).

More specifically, the camera module 100 is formed from a main camera module unit 101 and a lens section 102. A plurality of contact pads 103, 105 are arranged in left and right rows on the bottom surface of the main camera module unit 101.

The module connector 110 is formed in a box shape including a mounting cavity 111 that opens upward. On the upper surface of a bottom plate 112, a left and right row of contact holding grooves 113, 115 are formed parallel to each other, extending from about the center to the left and right inner side surfaces. Contact pins 116, 117 are installed in the contact holding grooves 113, 115.

When the camera module 100 is mounted in the mounting cavity 111, contact pads 103, 105 form elastic contacts with the contacts of the contact pins 116, 117. The camera image signal passes from the camera module 100 through the contact pads 103, 105 and is coupled by way of the contact pins 116, 117 to a printed circuit substrate (See JP Patent Publication No. 2004-63425).

Figure 9:
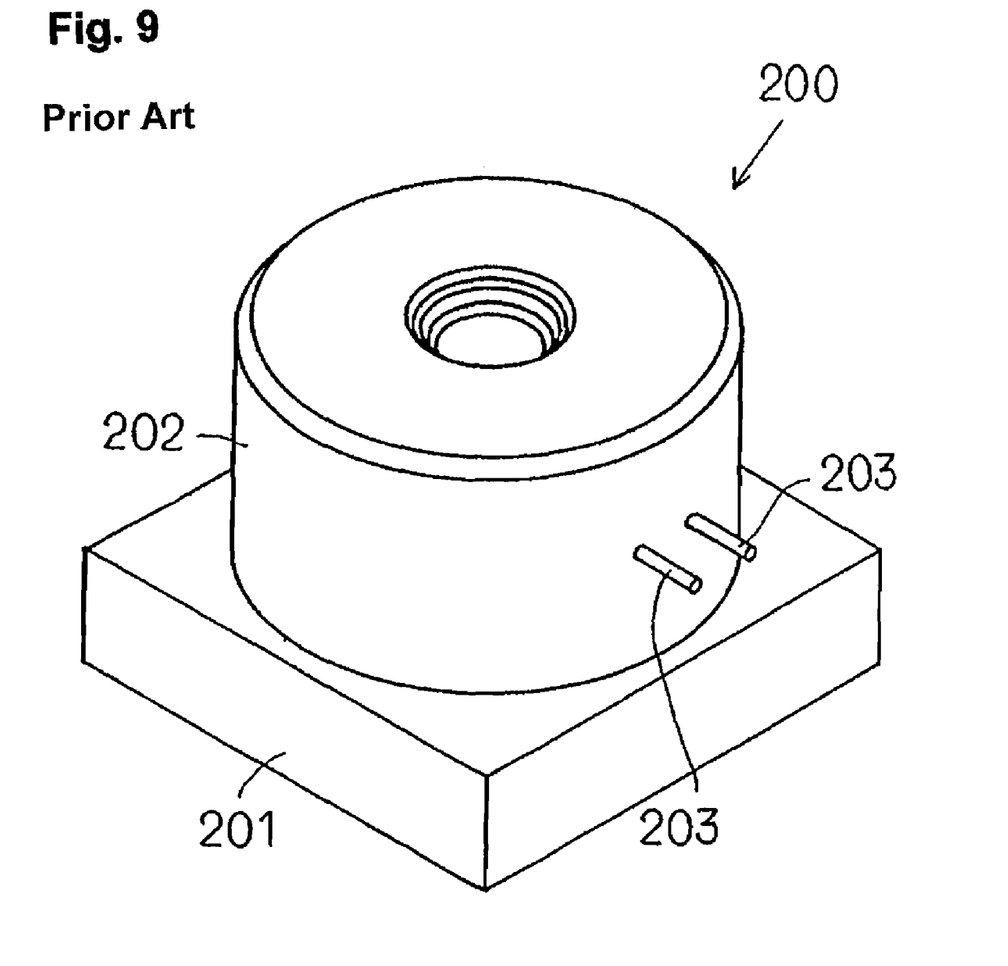
FIG. 9 is a perspective drawing of a conventional camera module with an auto-focus feature.

FIG. 9 shows a camera module 200 with an auto-focus feature equipped with a module base 201 and a main module unit (also referred to as a barrel) 202 disposed on the module base 201. An IC (integrated circuit), and other components, is mounted on a substrate installed inside the module base 201. A camera and motor are installed inside the module base 201. Because there is a need for a compact design (e.g., an outer size of about 15 mm×15 mm×9 mm), motor signal terminals 203, 203 cannot be extended from the module base 201 used by the camera signal terminals (not shown in the figure). Instead the motor signal terminals are extended out from a side surface of the main module unit 202.

As a result, the motor signal terminals 203, 203 are connected to the printed circuit substrate independently and separately from the module connector by using wires or an FPC (flexible printed circuit substrate).

Disadvantageously, when the camera module with auto-focus feature shown in FIG. 9 is electrically connected to the printed circuit substrate, camera signals can be transmitted to the printed circuit substrate using the module connector, but motor signals must be connected to the printed circuit substrate independently and separately from the module connector using wires or an FPC. This leads to the necessity of wires or an FPC in addition to the module connector, and also requires the work of connecting to the motor signal terminals 203, 203 using solder or the like.

Missing from the art is a structure for connecting a camera module having an auto-focus feature to a module connector without the need for wires or a FPC to achieve the connection. The present invention can satisfy this and other needs.

OBJECT AND SUMMARY OF THE INVENTION

One aspect of the invention provides a structure for connecting a camera module with an auto-focus feature that contains a camera and a motor, and on which is disposed a camera signal contact terminal and a motor signal terminal, to a module connector that includes a mounting cavity for mounting the camera module with auto-focus feature and on which is disposed a camera signal contact that contacts with the camera signal contact terminal when the camera module with auto-focus feature is mounted. A motor signal contact is disposed on the module connector. A contact section is disposed on the motor signal terminal so that a contact is formed with the motor signal contact when the camera module with auto-focus feature is mounted in the mounting cavity.

In a further aspect of the invention, the camera module with auto-focus feature is equipped with a module base, which has a camera signal contact terminal disposed on a side or a bottom surface, and a main module unit disposed on top of the module base. A camera and a motor are installed in the main module unit and a motor signal terminal is extended out from a side surface of the main module unit.

In yet further aspect of the invention, contact sections of the motor signal contact project into a terminal insertion cavity formed on the module connector separately from the mounting cavity. The motor signal terminal is extended out from a side surface of the main module unit and bent downward, a contact section thereof being formed at a position where a contact is formed with the contact sections of the motor signal contact when the camera module with auto-focus feature is mounted in the mounting cavity.

In another further aspect of the invention a contact section of the motor signal contact projects inward from an inner surface of the mounting cavity. The motor signal terminal is extended out from a side surface of the main module unit and bent downward, a contact section thereof being formed at a position where a contact is formed with the contact section of the motor signal contact when the camera module with auto-focus feature is mounted in the mounting cavity.

In yet another further aspect of the invention, a contact section of the motor signal contact projects inward from an inner surface of the mounting cavity. The motor signal terminal is extended out from a side surface of the main module unit and bent downward followed by a bend from a side surface of the module base to a bottom surface, a contact section thereof being formed at a position where a contact is formed with the contact section of the motor signal contact when the camera module with auto-focus feature is mounted in the mounting cavity.

In still another aspect of the invention, a structure that connects a camera module with an auto-focus feature on which is disposed a motor signal terminal to a module connector that includes a mounting cavity for mounting the camera module with auto-focus feature, wherein a contact section is disposed on the motor signal terminal so that a contact is formed with the motor signal contact when the camera module with auto-focus feature is mounted in the mounting cavity. Thus, the need for wires and FPCs to connect the camera signal contact terminal and the printed circuit substrate is eliminated, and the need for a connecting operation such as soldering is eliminated. Thereby, this makes production more efficient.

In yet still another aspect of the invention, the camera module with auto-focus feature is equipped with a module base, wherein a camera signal contact terminal is disposed on a side or a bottom surface, and a main module unit disposed on top of the module base. A camera and a motor are installed in the main module unit and a motor signal terminal is extended out from a side surface of the main module unit. Thereby, the structure of the camera module with auto-focus feature and the module connector can be simplified. For example, the camera module with auto-focus feature and the module connector of an embodiment of the present invention is provided simply by adding a few structural elements to a general-purpose camera module with auto-focus feature and module connector.

In still yet another aspect of the present invention, contact sections in the motor signal contact are projected into a terminal insertion cavity that is separate from the mounting cavity. A contact section of the motor signal terminal is formed at a position where a contact is formed with the contact sections of the motor signal contact when the camera module with auto-focus feature is mounted in the mounting cavity. As a result, a greater degree of freedom is possible for the placement of the camera signal contact and the motor signal contact of the module connector. This improves the degree of freedom possible with the design.

Further, in another aspect of the present invention, a contact section in the motor signal contact projects inward from an inner side surface of the mounting cavity. A contact section of the motor signal terminal is formed at a position where a contact is formed with the contact sections of the motor signal contact when the camera module with auto-focus feature is mounted in the mounting cavity. Thereby, there is no need to form a motor signal terminal insertion cavity on the module connector, thus allowing the module connector to be more compact.

In another further aspect of the invention, a contact section in the motor signal contact projects inward from an inner bottom surface of the mounting cavity. A contact section of the motor signal terminal is formed at a position where a contact is formed with the contact sections of the motor signal contact when the camera module with auto-focus feature is mounted in the mounting cavity. Thereby, there is no need to form a motor signal terminal insertion cavity on the module connector, thus allowing the module connector to be more compact.

The above, and other aspects, features and advantages of the present invention will become apparent from the following description read in conjunction with the accompanying drawings, in which like reference numerals designate the same elements.

DETAILED DESCRIPTION OF THE ILLUSTRATED EMBODIMENTS

By way of introduction an overview, presented is a structure for connecting a camera module with auto-focus feature and a module connector wherein the need for wires or an FPC to connect the motor signal terminals to the printed circuit substrate is eliminated, and the need for connecting work using solder or the like is eliminated.

FIGS. 1(a), 1(b) and FIGS. 2(a), 2(b) show a first embodiment of the present invention. In these figures, there is shown a camera module 10 with an auto-focus feature (hereinafter referred to as camera module) and a module connector 30.

Figure 1A:
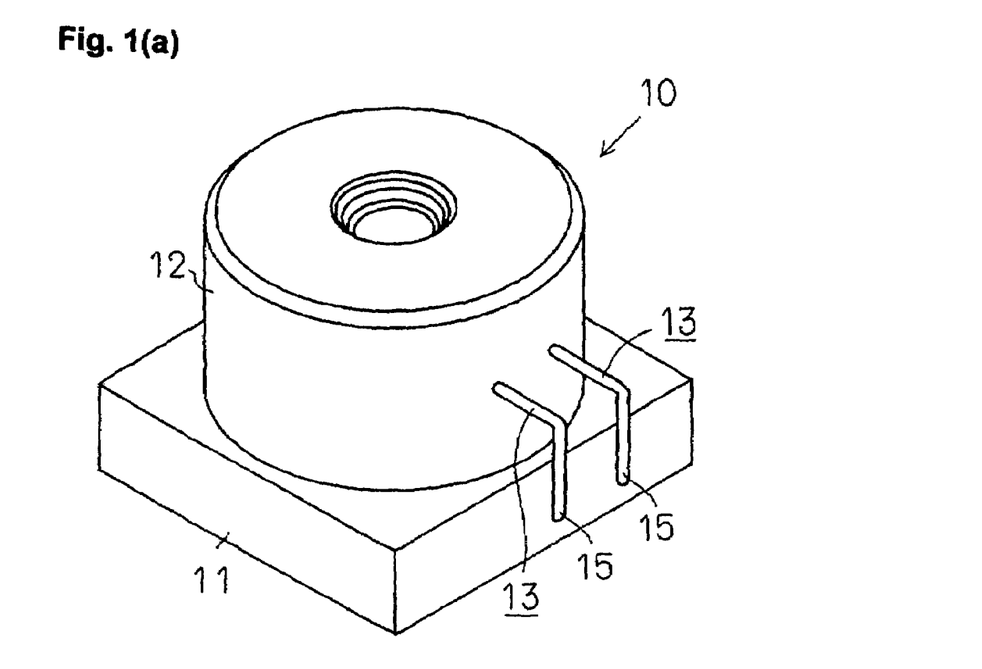
FIG. 1(a) is a perspective drawing of an embodiment of a camera module with an auto-focus feature in accordance with the present invention.

The camera module 10 includes: a module base 11 similar to that of the camera module 20 with auto-focus feature shown in FIG. 9, and a main module unit 12 disposed on the module base 11. A substrate on which an IC and the like are mounted is installed in the module base 11, and a camera and a motor (e.g., a stepping motor) are installed in the main module unit 12.

On the bottom surface of the module base 11 are formed a left and a right row of contact pads (camera signal contact terminals, not shown in the figures) similar to those of the camera module 100 shown in FIG. 7.

On the side surface of the main module unit 12, motor signal terminals 13, 13, roughly similar to those of the camera module 200 with auto-focus feature shown in FIG. 9, are projected from a side surface of the module base 11. However, these motor signal terminals 13, 13 differ from those of the camera module 200 with auto-focus feature in that they are bent downwards, and contact sections 15, 15 are formed at the ends.

Figure 1B:
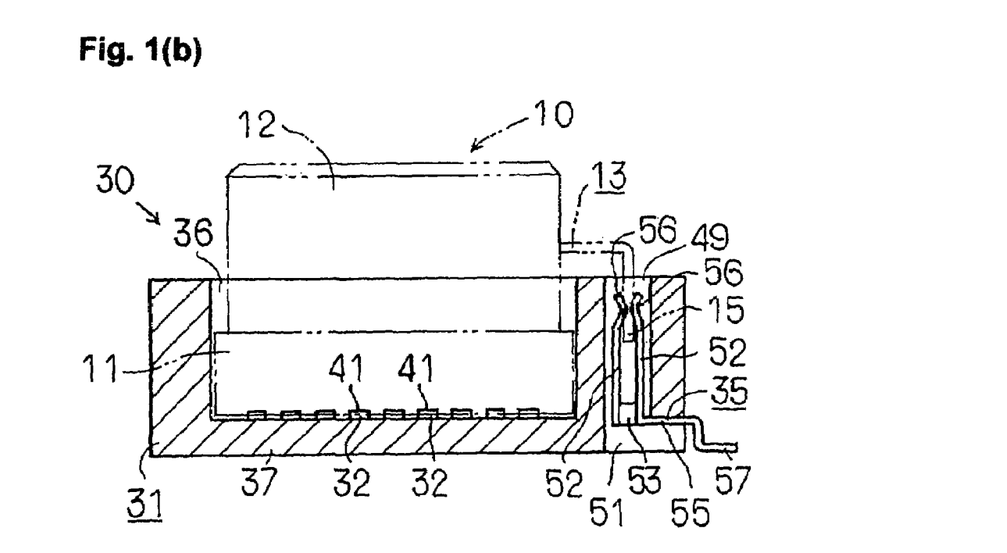
FIG. 1(b) is a cross-section drawing of an embodiment of a module connector in accordance with the present invention along the 1B-1B line in FIG. 2(a)

The module connector 30 includes a housing 31, a plurality of camera signal contacts 32, 33, along with motor signal contacts 35 housed and supported in the housing 31.

Figures 2A, 2B:
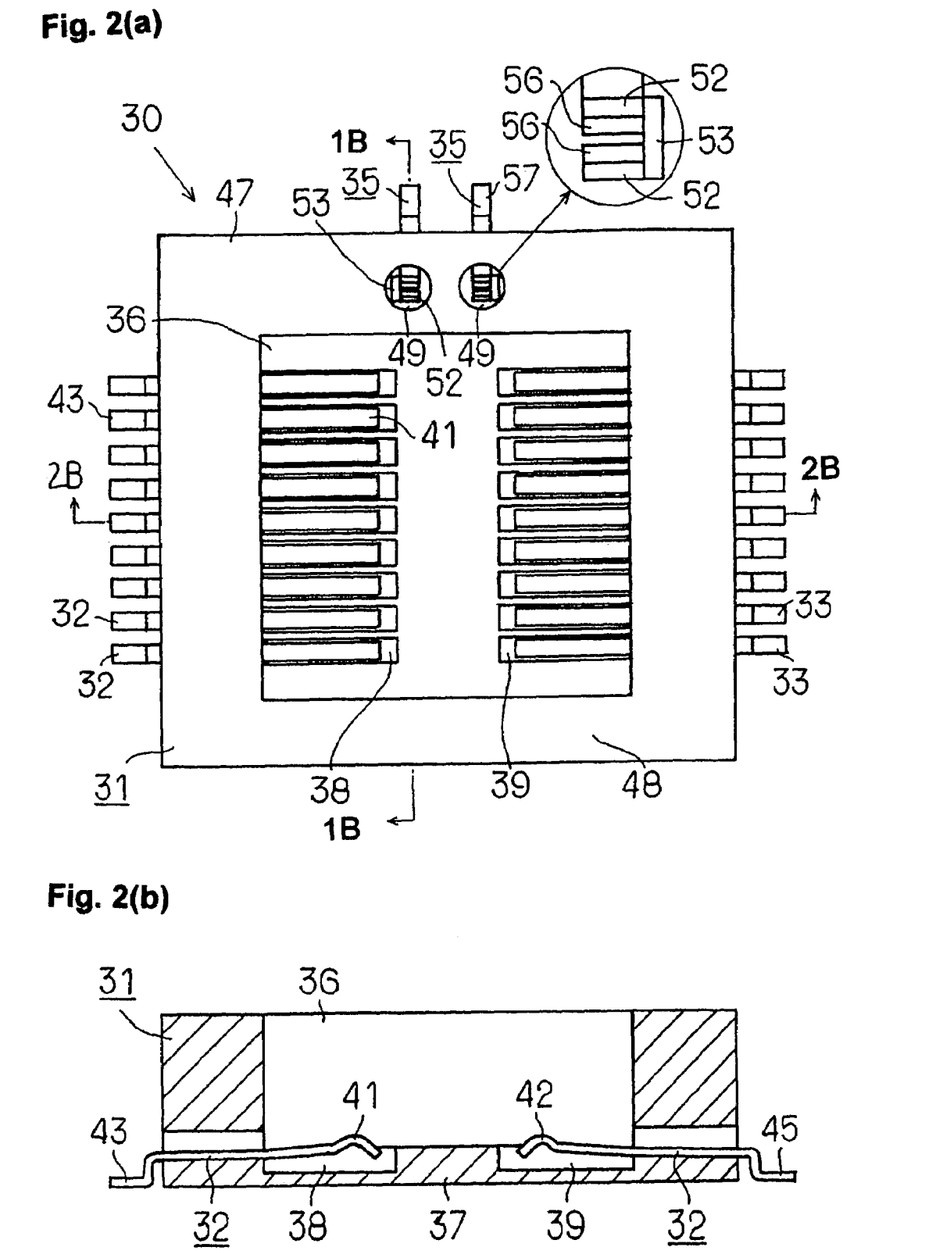
FIG. 2(a) is a plan drawing of the module connector of FIG. 1(a)
FIG. 2(b) is a cross-section drawing along the 2B-2B line in FIG. 2(a)

The housing 31 is formed from an insulative synthetic resin, and, as shown in FIG. 1(a) and FIGS. 2(a), (b), is formed in a box shape with a mounting cavity 36 opening upward. On the upper surface of the bottom plate 37 of the housing 31 are formed a left row and right row, parallel to each other, of contact housing grooves 38, 39. Camera signal contacts 32, 33 are housed and supported in these contact housing grooves 38, 39. Contact sections 41, 42 of these contacts 32, 33 project into the mounting cavity 36, and the contact sections 43, 45 project externally.

Side plates 47, 47 of the housing 31 are parallel to the contact housing grooves 38, 39. Terminal insertion cavities 49, 49, having a circular lateral cross section and opening upward, are formed on one of the side plate 47. The terminal insertion cavities 49, 49 house and support motor signal contacts 35, 35 inserted from contact insertion openings 51, 51.

The contact insertion openings 51, 51 are formed as openings extending over the lower section and side section of the side plate 47 of the housing 31.

The motor signal contacts 35, formed by punching and bending a thin, conductive metal plate, include a pair of elastically deformable contact pieces 52, 52, a connecting piece 53, connecting these two elements, and a contact piece 55 connected to the connecting piece 53. An engagement projection (not shown in the figure) is formed at the base end of the contact pieces 52 and the free end is formed with contact sections 56 bent in an arcuate shape. Contact sections 57 are formed at the free end on the contact piece 55.

The connecting of the camera module 10 and the module connector 30 according to the first embodiment will be described, with references to FIG. 1(b).

Before connecting the camera module 10, a reflow device or the like is used to solder the contact sections 43, 45, 57 of the contacts 32, 33, 35 to the corresponding contact sections (e.g., contact pad) on the printed circuit substrate (not shown in the figure). Also, the contacts 32, 33, 35 are electrically connected to the corresponding circuit patterns on the printed circuit substrate.

Next, when the camera module 10 is mounted in the mounting cavity 36 of the module connector 30, as shown in FIG. 1(b), the contact sections (e.g., contact pads, not shown in the figure) of the camera signal terminals exposed at the bottom surface of the module base 11 form an elastic contact with the contact sections 41, 42 of the camera signal contacts 32, 33. The contact sections 15 of the motor signal terminals 13 form elastic contact with contact sections 56 by being pushed in between the contact pieces 52 which form pairs from each of the motor signal contacts 35.

As a result, the motor signal terminals 13 of the camera module 10 are electrically connected to corresponding circuit patterns on the printed circuit substrate by way of the motor signal contacts 35 of the module connector 30. This eliminates the need in the conventional technology for wires or FPCs and eliminates the need to perform connecting operations such as soldering.

Also, the camera signal terminals of the camera module 10 are electrically connected to corresponding circuit patterns on the printed circuit substrate by way of camera signal contacts 32, 33 of the module connector 30.

Figure 3A:
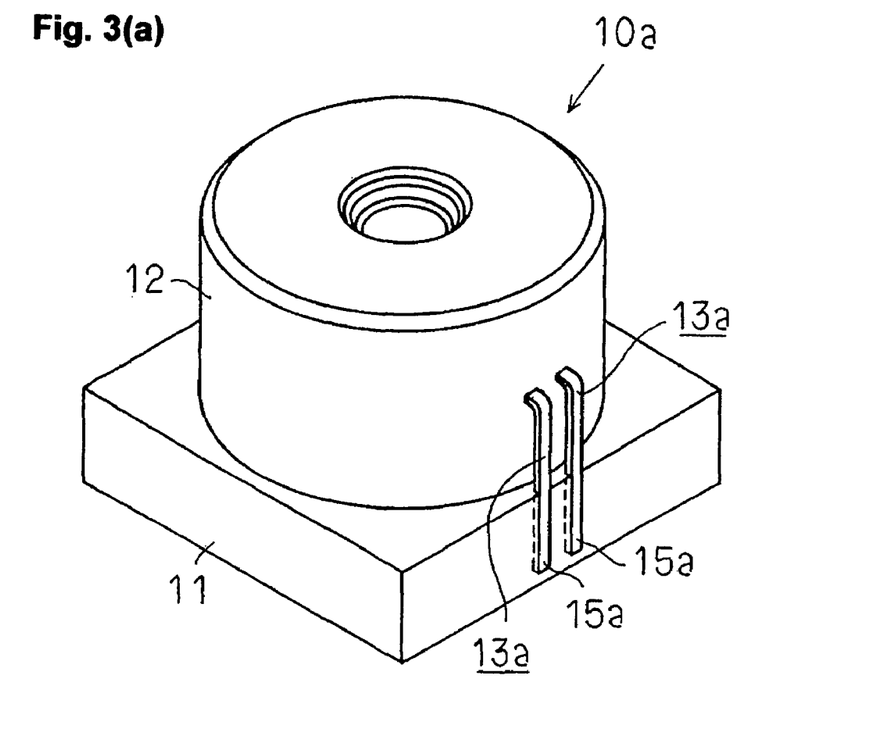
FIG. 3(a) is a perspective drawing of another embodiment of a camera module with an auto-focus feature in accordance with the present invention.
Figure 3B:
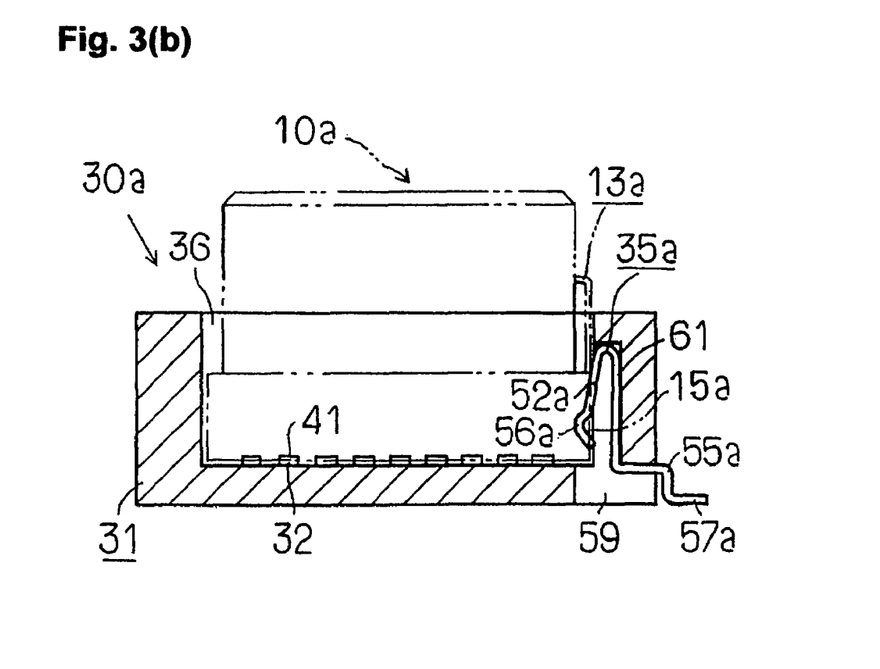
FIG. 3(b) is a cross-section drawing of another embodiment of a module connector in accordance with the present invention along the 3B-3B line in FIG. 4.
Figure 4:
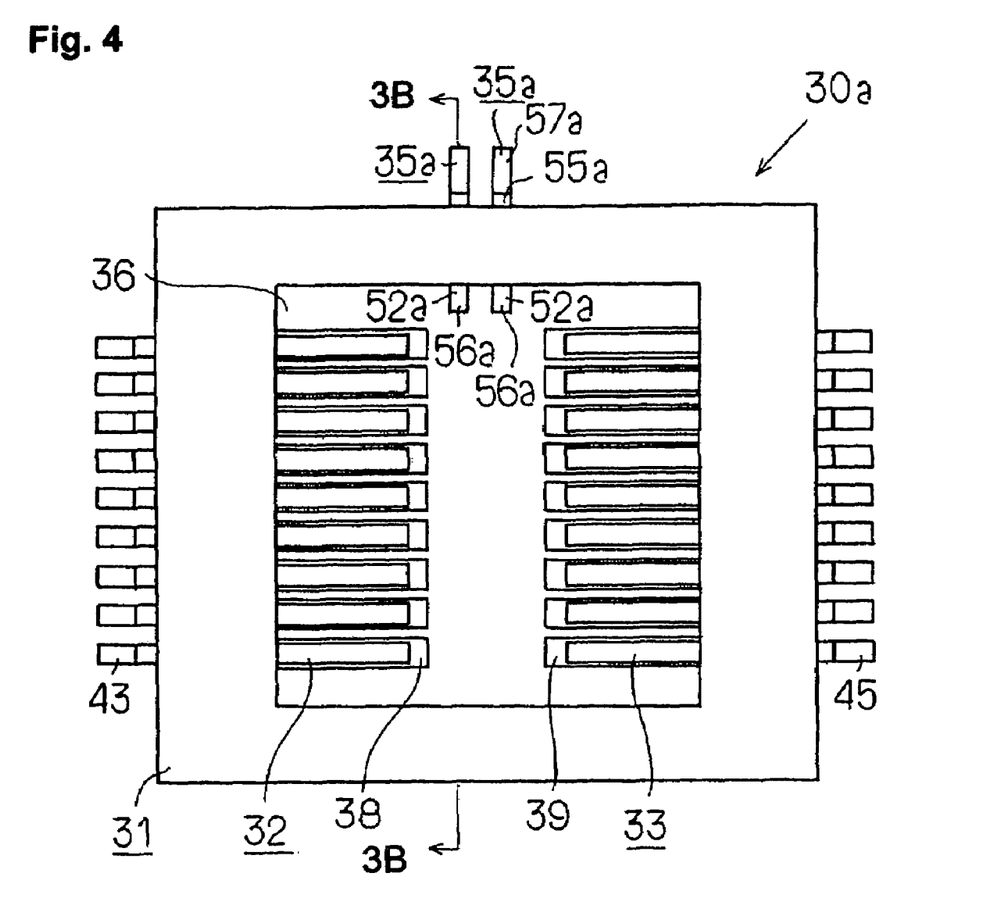
FIG. 4 is a plan drawing of the module connector depicted in FIG. 3(b)

FIG. 3 and FIG. 4 show a second embodiment of the present invention. In the figures, there is shown a camera module 10a and a module connector 30a.

In the camera module 10a, motor signal terminals 13a are formed by bending narrow, band-shaped conductor pieces as shown in FIG. 3(a). The structure is roughly similar to that of the camera module 10 in FIG. 1 except that sections of the terminals are embedded in a side wall of the module base 11, with the surfaces of the contact sections 15a being exposed at the outer wall surface of the module base 11.

In the module connector 30a, motor signal contacts 35a formed by bending narrow, band-shaped conductor pieces as shown in FIG. 3(b) and FIG. 4, are housed and supported in contact housing sections 59, 59 and include elastically deformable contact pieces 52a, 52a, attachment pieces 61, 61, and contact pieces 55a, 55a. The contacts are roughly similar to those of the module connector 30 shown in FIG. 1(b) and FIG. 2 except that contact sections 56a, 56a, formed at the free ends of the contact pieces 52a, 52a, are formed so that they project into the mounting cavity 36 from the inner wall surface of a side plate of the housing 31, and there are no terminal insertion cavities 49, 49.

Next, connecting of the camera module 10a to the module connector 30a according to the second embodiment will be described, with references to FIG. 3(b).

Before connecting the camera module 10a, the contact sections 43, 45, 57a of the contacts 32, 33, 35a of the module connector 30a are soldered to the corresponding contact sections on the printed circuit substrate. Also, the contacts 32, 33, 35a are electrically connected to the corresponding circuit patterns on the printed circuit substrate.

Next, when the camera module 10a is mounted in the mounting cavity 36 of the module connector 30a, as shown in FIG. 3(b), the contact sections 15a, 15a of the motor signal terminals 13a, 13a form an elastic contact with the contact sections 56a, 56a of the motor signal contacts 35a, 35a. As a result, the motor signal terminals 13a, 13a of the camera module 10a are electrically connected to the corresponding circuit patterns of the printed circuit substrate by way of the contacts 35a, 35a.

The camera signal terminals of the camera module 10a are electrically connected to the corresponding circuit patterns on the printed circuit substrate by way of the contacts 32, 33 as in FIG. 1.

Figure 5A:
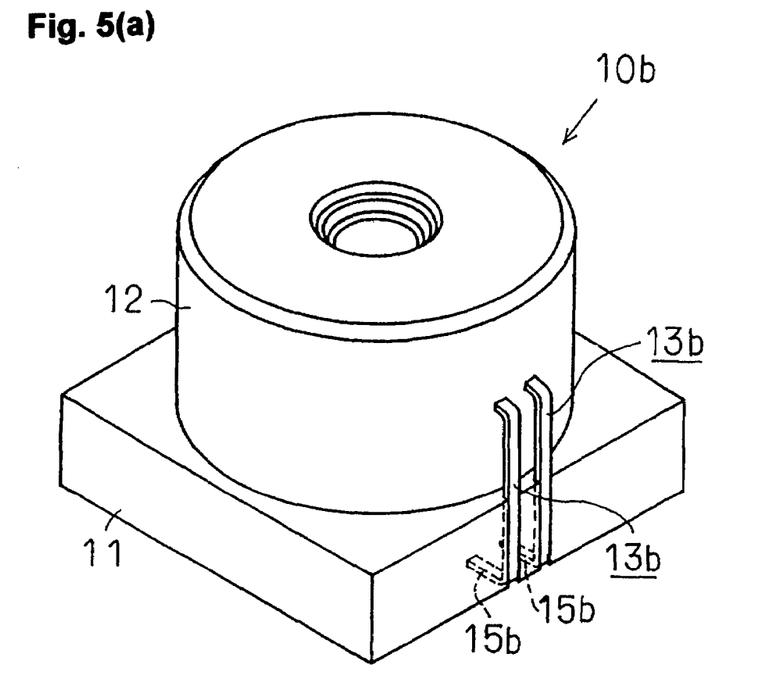
FIG. 5(a) is a perspective drawing of another embodiment of a camera module with an auto-focus feature.
Figure 5B:
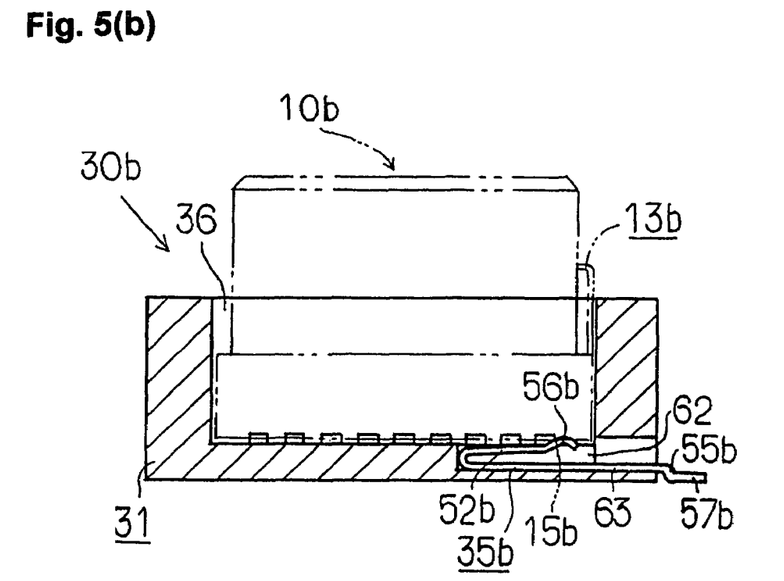
FIG. 5(b) is a cross-section drawing of another embodiment of a module connector in accordance with the present invention along the 5B-5B line in FIG. 6.
Figure 6:
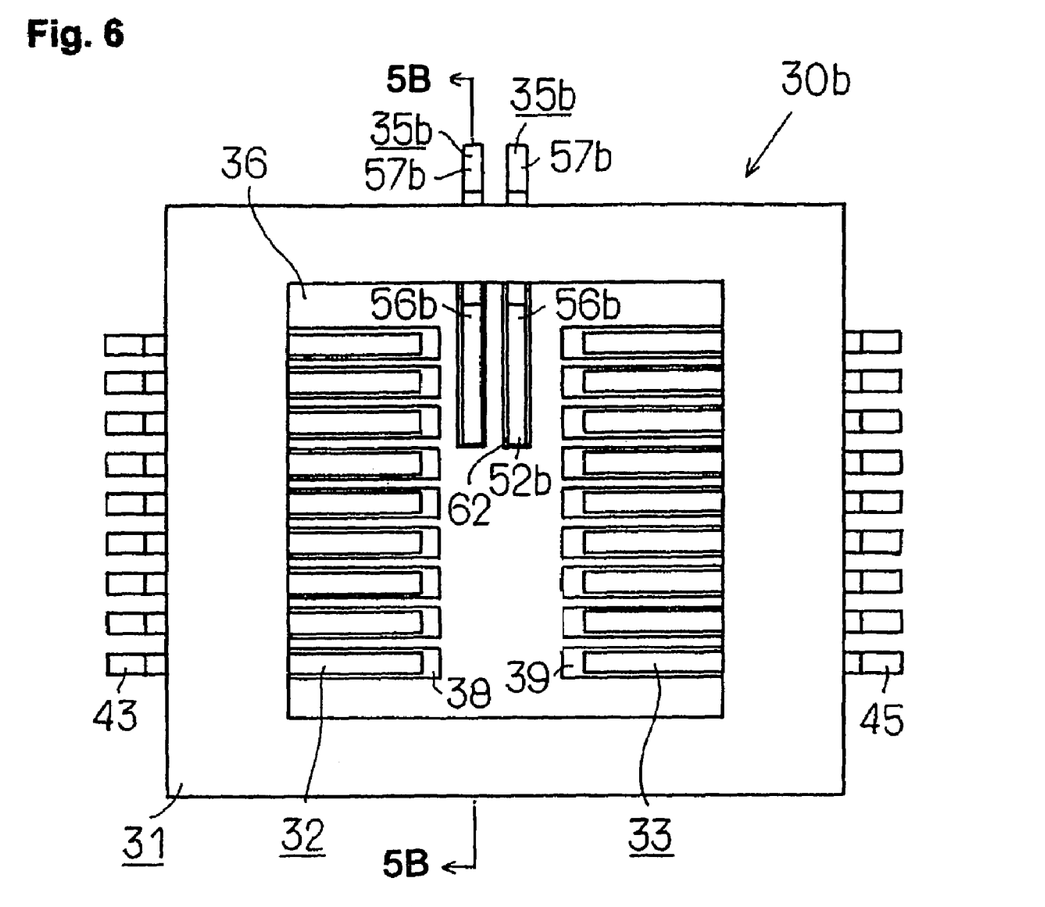
FIG. 6 is a plan drawing of the module connector depicted in FIG. 5(b)

FIG. 5 and FIG. 6 show a third embodiment of the present invention. In the figures, there is shown a camera module 10b and a module connector 30b.

In the camera module 10b, motor signal terminals 13b, 13b are formed by bending a narrow, band-shaped conductor piece as shown in FIG. 5(a). The structure is roughly similar to that of the camera module 10a from FIG. 3 except that a section of the terminals is embedded over a span extending from a side wall to the bottom wall of the module base 11, and the surface of contact sections 15b, 15b are exposed from the outside surface of the bottom wall of the module base 11.

In the module connector 30b, motor signal contacts 35b, 35b, formed by bending a narrow, band-shaped conductor piece as shown in FIG. 5(b) and FIG. 6, are housed and supported in the contact holding sections 62, 62 and include elastically deformable contact pieces 52b, 52b, attachment pieces 63, 63, and contact pieces 55b, 55b. The structure is roughly similar to that of the module connector 30a shown in FIG. 3(b) and FIG. 4 except that contact sections 56b, 56n formed on the free ends of the contact pieces 52b, 52b are formed so that they project into the mounting cavity 36 from the inner surface of the bottom plate of the housing 31.

Next, connecting of the camera module 10b to the module connector 30b according to the third embodiment will be described.

Before connecting the camera module 10b, the contact sections 43, 45, 57b of the contacts 32, 33, 35b of the module connector 30b are soldered to the corresponding contact sections on the printed circuit substrate. Also, the contacts 32, 33, 35b are electrically connected to the corresponding circuit patterns on the printed circuit substrate.

Next, when the camera module 10b is mounted in the mounting cavity 36 of the module connector 30b, as shown in FIG. 5(b), the contact sections 15b, 15b of the motor signal terminals 13b, 13b form an elastic contact with the contact sections 56b, 56b of the motor signal contacts 35b, 35b. As a result, the motor signal terminals 13b, 13b of the camera module 10b are electrically connected to the corresponding circuit patterns of the printed circuit substrate by way of the contacts 35b, 35b.

As in the case shown in FIG. 1, the camera signal terminals of the camera module 10b are electrically connected to corresponding circuit patterns on the printed circuit substrate by way of the contacts 32, 33.

In the first, second, and third embodiments, the structures of the camera module with auto-focus feature and the module connector are simplified by having the camera module with auto-focus feature include a module base and a main module unit, and by having a camera and motor installed inside the main module unit. However, the present invention is not restricted to this. It is also within the scope of the present invention to provide a structure for connecting a camera module with an auto-focus feature containing a camera and a motor and on which is disposed a camera signal contact terminal and a motor signal terminal to a module connector that includes a mounting cavity for mounting the camera module with auto-focus feature, and on which is disposed a camera signal contact coming into contact with the camera signal contact terminal when the camera module with auto-focus feature is mounted, a structure for connecting the camera module with auto-focus feature and the module connector, wherein a motor signal contact is disposed on the module connector, and a contact section is disposed on the motor signal terminal so that a contact is formed with the motor signal contact when the camera module with auto-focus feature is mounted in the mounting cavity.

Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one described embodiment to another are also fully intended and contemplated. The invention is defined solely with regard to the claims appended hereto, and equivalents of the recitations therein.

What is claimed is:

1. A structure that connects a camera module with a module connector, wherein the camera module includes an auto-focus feature and a motor, and on which is disposed a camera signal contact terminal and a motor signal terminal, wherein the module connector includes a mounting cavity for mounting said camera module, and on which is disposed a camera signal contact coming into contact with said camera signal contact terminal when said camera module with auto-focus feature is mounted,
   a structure for connecting said camera module with auto-focus feature and said module connector wherein:
   a motor signal contact is disposed on said module connector; and
   a contact section is disposed on said motor signal terminal so that a contact is formed with said motor signal contact when said camera module with auto-focus feature is mounted in said mounting cavity.

2. The structure as described in claim 1, further comprising:
   said camera module with auto-focus feature equipped with a module base having a camera signal contact terminal disposed on a side surface or a bottom surface, and a main module unit disposed on top of said module base; and
   a camera and a motor installed in said main module unit, and a motor signal terminal extended from a side surface of said main module unit.

3. The structure as described in claim 2, further comprising:
   contact sections projecting from said motor signal contact into a terminal insertion cavity formed on said module connector separately from said mounting cavity; and
   said motor signal terminal extended out from a side surface of said main module unit and bent downward, a contact section thereof being formed at a position where a contact is formed with said contact sections of said motor signal contact when said camera module with auto-focus feature is mounted in said mounting cavity.

4. The structure as described in claim 2, further comprising:
   a contact section in said motor signal contact projected inward from an inner side surface of said mounting cavity; and
   said motor signal terminal extended out from a side surface of said main module unit and bent downward, a contact section thereof being formed at a position where a contact is formed with said contact section of said motor signal contact when said camera module with auto-focus feature is mounted in said mounting cavity.

5. The structure as described in claim 2, further comprising:
   a contact section in said motor signal contact projected inward from an inner bottom surface of said mounting cavity; and
   said motor signal terminal extended out from a side surface of said main module unit and bent downward followed by a bend from a side surface of said module base to a bottom surface, a contact section thereof being formed at a position where a contact is formed with said contact section of said motor signal contact when said camera module with auto-focus feature is mounted in said mounting cavity.

* * * * *